United States Patent [19]

Mieling

[11] Patent Number: 4,782,596
[45] Date of Patent: Nov. 8, 1988

[54] WHEEL ALIGNING METHOD AND APPARATUS

[76] Inventor: James A. Mieling, 1030 Viking Ct., Batavia, Ill. 60510

[21] Appl. No.: 126,573

[22] Filed: Nov. 30, 1987

[51] Int. Cl.⁴ ............................................. G01B 5/255
[52] U.S. Cl. ................................................. 33/203.18
[58] Field of Search .......... 33/203.18, 203.12, 203.13, 33/608, 600, 203.19

[56] References Cited

U.S. PATENT DOCUMENTS 4,453,315 6/1984 Mosiman et al. ............ 33/203.18 X
4,651,431 3/1987 Mieling ............................ 33/203.18

Primary Examiner—H. N. Haroian
Attorney, Agent, or Firm—Bernard L. Kleinke

[57] ABSTRACT

A wheel aligning device and a method of using it, includes a rigid member having a centrally disposed large rearwardly extending hub for attachment to a vehicle strut assembly and a base block pivotally mounted in an off-set manner to the plate for height adjustment purposes. In order to mount a camber adjustment gauge to the device, a small forwardly projecting hub disposed within the well of the larger hub, includes a front wall for supporting a camber gauge, so that a gauge zeroing operation can be eliminated. Color coding indicia on the base block provides ready identification as to the height adjustment setting. Wave washers are provided at the pivotal connection of the base block to facilitate the adjustment thereof.

15 Claims, 2 Drawing Sheets

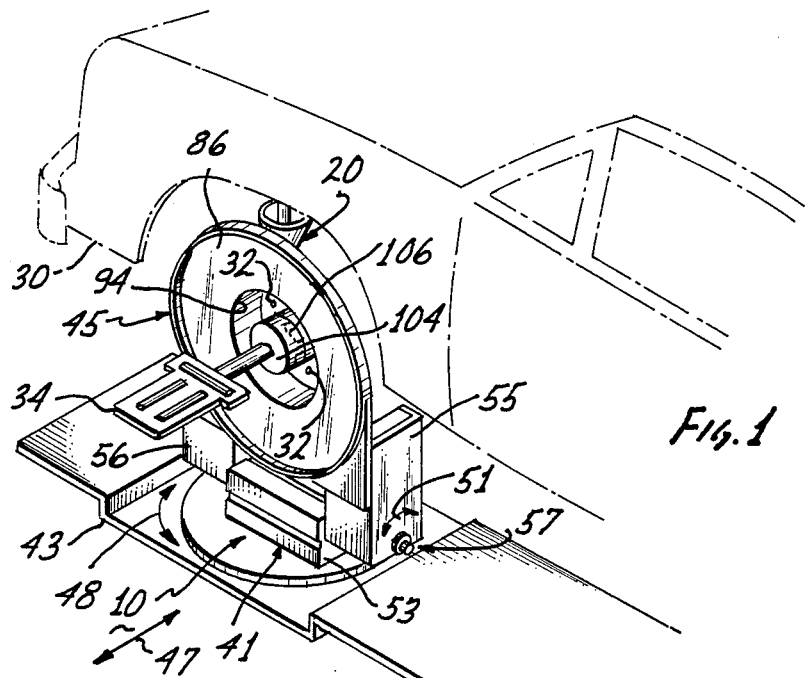
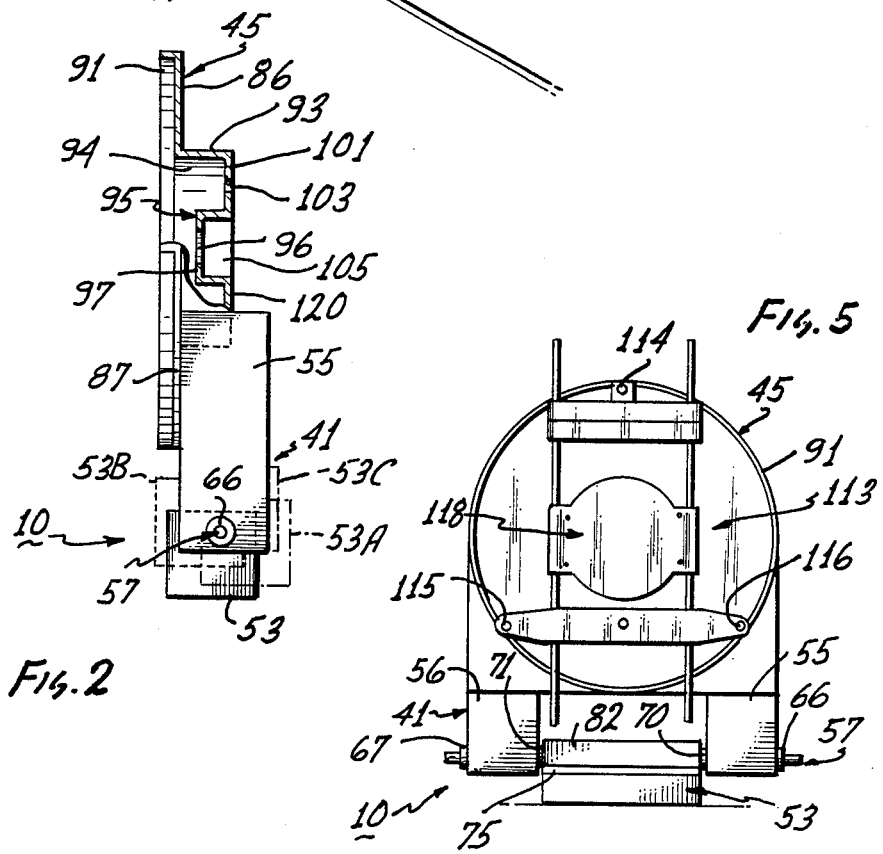

WHEEL ALIGNING METHOD AND APPARATUS

TECHNICAL FIELD

The present invention relates in general to a device for helping align vehicle wheels, and a method of using it. The invention more particularly relates to a device and a method for adjusting caster/camber, as well as toe, of a vehicle wheel.

BACKGROUND ART

There have been many different types and kinds of devices used in assisting the wheel alignment of vehicles. For example, reference may be made to U.S. Pat No. 4,651,431.

The device disclosed in the foregoing patent, is attachable to a wheel strut assembly of the vehicle, in place of the vehicle's wheel, to help support the vehicle during a wheel alignment operation. The alignment device supports either a camber adjustment gauge, or a toe gauge. The alignment device is adjustable in its height, to accommodate different vehicles. For this purposes, a base in the form of an elongated block, is pivotally mounted in an off-center manner for enabling it to be positioned with different ones of its faces directed downwardly, to adjust the overall height of the device to accommodate a given vehicle.

While such an alignment device has been successful in its manner of operation, it would be desirable to have an improved version of the device, which would enable it to assist in the wheel aligning operation in the camber adjustment operation, so that it can be performed in an even faster manner. In this regard, for at least some vehicles, when a vehicle wheel is not true, it will wobble when rotated. Therefore, a conventional mounting arm is ordinarily used to be attached to the device for adjustably positioning the camber adjustment gauge.

When using the patented wheel aligning device for wheel alignment, the vehicle wheel must first be removed, and the alignment device fastened to the strut assembly over the axial hub, to help support the vehicle. A conventional camber gauge having magnets mounted in its base, is attached magnetically to the end face of the axle hub. However, due to the irregular shape of the worn hub, the gauge is frequently not firmly attached in place. Therefore, a mounting arm is used on the wheel aligning device.

In such an operation, a conventional mounting arm is attached to the patented alignment device for supporting the camber adjustment gauge. The vehicle is then elevated, so that the wheel can be rotated to zero the camber adjustment gauge. In this regard, due to wobble, the camber adjustment gauge must be adjusted positionally by the mounting arm to adjust for wobble. Thereafter, the vehicle is then lowered to the ground, so that the wheel alignment portion of the operation can commence in a conventional manner.

Therefore, it would be highly desirable to have an improved wheel aligning device, which can eliminate the need to zero the camber adjustment gauge, without the use of a mounting arm.

Since an alignment device is used, for example, on both front wheels, if the devices are not both set to the same height adjustment, it is very difficult, if not impossible, to perform a proper alignment of the wheels of the vehicle. In any event, in such a situation, a great loss of time can result. When the mistake is first discovered, the alignment procedure must be repeated unnecessarily from the beginning. Thus, it would be highly desirable to have a technique for preventing, or at least greatly alleviating, such a problem.

Therefore, it would also be desirable to have an improved wheel aligning device, of the type having a vertical height adjustment, wherein the chance of setting improperly the height adjustment is greatly reduced, if not totally eliminated.

DISCLOSURE OF INVENTION

Therefore, it is the principal object of the present invention to provide a new and improved wheel aligning device, and a method of using it, whereby a caster gauge zeroing step of the wheel aligning operation, can be eliminated, to make it more fast and efficient.

Another object of the present invention is to provide such a new and improved wheel aligning device and method of using it, whereby the chance of setting the height adjustment improperly is greatly reduced.

Briefly, the above and further objects of the present invention are realized by providing a wheel aligning device, which can both eliminate the caster gauge zeroing step of the wheel aligning operation, and also prevent, or at least greatly eliminate, the problem of an improper height adjustment.

A wheel aligning device and a method of using it, includes a rigid member having a centrally disposed large rearwardly extending hub for attachment to a vehicle strut assembly and a base block pivotally mounted in an off-set manner to the plate for height adjustment purposes. In order to mount a camber adjustment gauge to the device, a small forwardly projecting hub disposed within the well of the larger hub, includes a front wall for supporting a camber gauge, so that a gauge zeroing operation can be eliminated. Color coding indicia on the base block provides ready identification as to the height adjustment setting. Wave washers are provided at the pivotal connection of the base block to facilitate the adjustment thereof.

Due to the central location of the front wall, there is no need to zero the camber adjustment gauge, since any wobble of the wheel would not be detected by the camber adjustment gauge, due to the positioning thereof relative to the wheel. Thus, the initial gauge zeroing operation can be eliminated, and a savings in time and effort are realized by the method and apparatus of the present invention.

By the provision of the color coding indicia, the user can readily and conveniently identify the particular height adjustment setting of the alignment device. Therefore, a pair of the devices mounted on the front wheels, for example, are immediately and obviously known to the user, that both devices have the identical same height setting. Thus, unwanted and unnecessary loss in time is prevented, when one device is inadvertently set at a different height setting than the other such device.

The wave washers mounted in the pivotal connection of the base block, overcomes the problem of the off center mounting of the base block causing it to fall or flop under the force of gravity to the same position. In this regard, the wave washers enable the base block to be retained releasably in selected ones of the four possible locations. However, the user can conveniently manually rotate the block to the desired height adjustment location and it will be retained in that position.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a pictorial view of a wheel aligning apparatus, constructed in accordance with the present invention shown on the left front wheel of an automobile;

FIG. 2 is an elevational view of the device of FIG. 1;

FIG. 5 is a front elevational view of the apparatus of FIG. 1, showing it attached to a strut assembly and having a different type of camber adjustment gauge secured thereto.

BEST MODE FOR CARRYING OUT THE INVENTION

Figure 3:
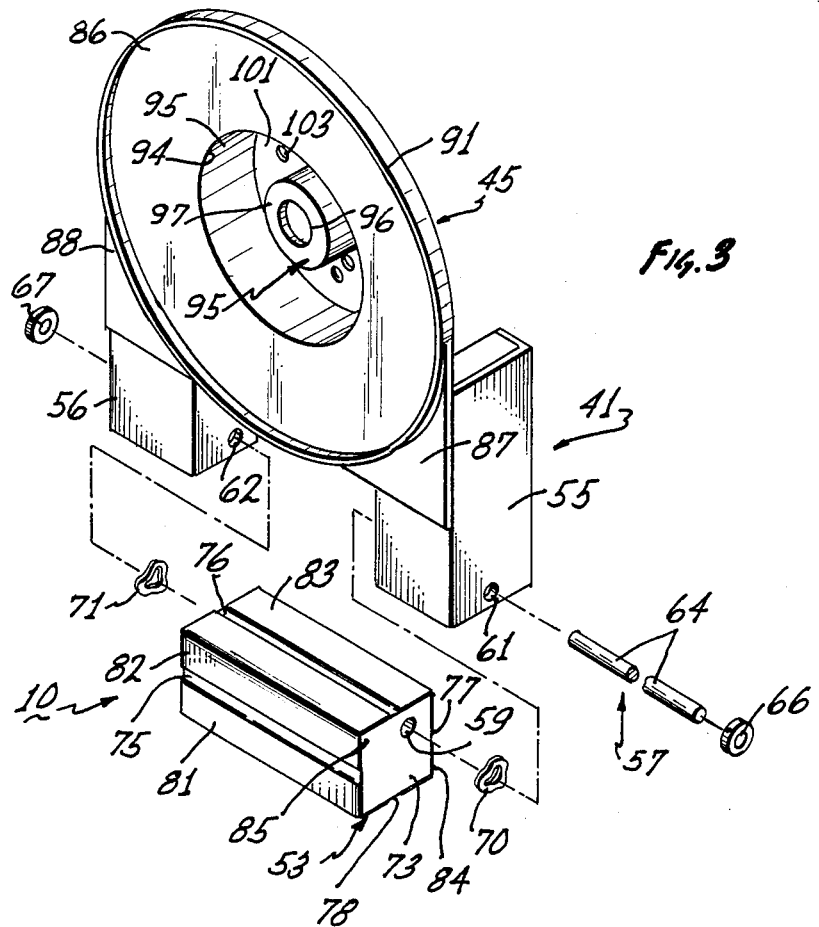
FIG. 3 is an enlarged, exploded pictorial view of the device of FIG. 1, illustrating the assembly of the base thereof.

Referring now to the drawings, and more particularly to FIGS. 1, 2 and 3 thereof, there is shown a wheel aligning device 10, which is constructed in accordance with the present invention. The apparatus is shown mounted on the front-wheel strut assembly 20 (FIG. 1) of a front-wheel drive vehicle 30, with bolts 32, in place of the vehicle's wheel (not shown). A camber adjustment gauge 34 is also attached to the device 10 as hereinafter described in greater detail, to facilitate the wheel aligning operation.

The device 10 generally comprises a base assembly 41 resting on top of a suitable support means or surface 43, such as an alignment rack. An upper rigid member assembly 45, which is adapted to be mounted to an axle hub of the strut assembly 20. Thus, the device 10 serves to help support the vehicle 30, and replaces the left-front vehicle's wheel (not shown). This arrangement enables the device 10 to support the vehicle 30 on the floating platform 43, which permits both a rectilinear movement in the directions indicated by an arrow 47 and rotationally in the direction indicated by an arrow 48.

The base assembly 41 provides a pivotal movement in the direction 51 (FIG. 1), to facilitate the alignment operation. In this regard, the device 10 is adapted to pivot or rock about a horizontal axis extending through the base assembly 41, as will be hereinafter described in greater detail. Thus, the various directions of movement indicated by the arrows 47, 48 and 51, indicate how the camber and toe adjustments are facilitated. The wheel aligning device 10 operates in a similar manner as the wheel aligning apparatus disclosed in U.S. Pat. No. 4,651,431.

Considering now the base assembly 41 in greater detail, it includes an elongated base block 53, which rests on top of the support surface 43. A pair of vertical members 55 and 56 are pivotally attached at their lower ends to the block 53, and are fixedly connected at their upper ends to the rigid member assembly 45. An off-center pivotal connection generally indicated at 57 enables the overall height of the device 10 to be adjusted vertically depending upon which one of the four faces of the block 53 face downwardly, as indicated in the solid and phantom line showing of the block 53 in FIG. 2. In this regard, the solid line showing indicates the largest height adjustment, and the broken line showings of the block 53 at 53A through 53C, illustrate the other three height adjustments.

Figure 4:
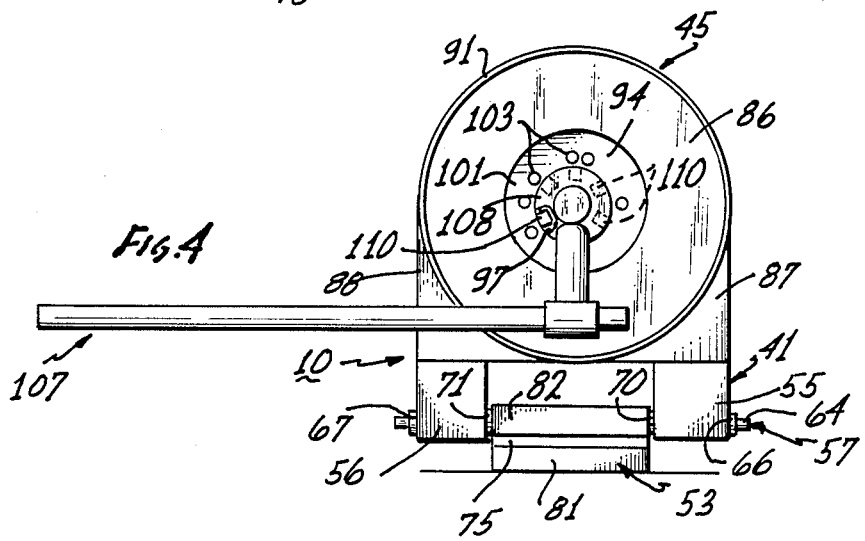
FIG. 4 is a front elevational view of the device of FIG. 1, illustrating it being attached to a toe gauge.

Considering now the base assembly 41 in greater detail, with particular reference to FIG. 3, the block 53 has an axially extending bore or hole 59, which is adapted to be aligned with a pair of bores or holes 61 and 62 in the respective legs 55 and 56 for receiving a pivot pin 64, which is adapted to extend through the aligned bores. A pair of locking collars 66 and 67 are fixed to the distal ends of the locking pin 64, as best seen in FIGS. 4 and 5.

In order to enable the block 53 to be retained releasably in any one of its four positions, a pair of wave washers 70 and 71 surround the locking pin 64 intermediate the block 53 and the respective legs 55 and 56. In this regard, the wave washers 70 and 71 provide a spring tension or pressure between the block and the legs to retain the block 53 in a desired position relative to the legs. In this regard, the wave washers spring bias the block 53 into a desired axial orientation relative to its longitudinal axis. In order to change the position of the block relative to its longitudinal axis, the user can grasp the block 53 and rotate it about the axis of the pivot pin 64 into any desired one of the four positions illustrated in FIG. 2.

Even though the center of gravity of the block 53 may be disposed above the pivotal connection 57, the wave washers 70 and 71 retain the block in the desired position, sufficiently long enough to position the device 10 in place so that it can be fastened to the strut assembly 20.

Considering now the block 53 in greater detail, with particular reference to FIG. 3, the block 53 generally includes a block member 73, which is composed of a suitable material, such as metal. It is generally square in cross section throughout its length. The block member 73 has four rectangular painted surfaces 75, 76, 77 and 78. In this regard, each surface is painted or otherwise coated, with a different color. Thus, each painted surface has a different indicia, so that the user can readily identify the current height adjustment of the device 10. Thus, a similar wheel aligning device (not shown) can be mounted on the other side of the vehicle, such as to the right front strut assembly, and the user is immediately made aware of the height adjustment for both devices attached to both front assemblies as being at the same elevation relative to the supporting surface, by viewing the color coded faces of the block member. Thus, according to the present invention, costly errors are eliminated, or at least greatly reduced by the use of the device 10 of the present invention.

A set of four friction pads 81, 82, 83 and 84 are secured to the outer surface of the block member 73 over the corners thereof to partially cover a pair of adjacent faces, to grip frictionally the support surface to provide a more stable support for the device 10. For example, the friction pad 82, which is similar to the other three friction pads, is rectangular in shape, and is composed of a suitable material, such as rubber. The friction pad 82 has an outer roughened or textured surface, and is secured by any suitable technique, such as by a suitable adhesive, to the block member 73. The pad 82 is affixed to a portion of the painted surfaces 75 and 76 in overlying relationship, and extends over an elongated corner portion 85 of the block member 73. Thus, adjacent friction pads, such as the friction pads 82 and 83, are spaced-apart along the central portion of the painted surface, such as the painted surface 76 to expose it to view. Thus, each one of the side faces of the block member 73 has an elongated strip portion of the painted surface exposed to view to serve as an indicia to the user for indicating the current height setting of the device 10.

Considering now the rigid assembly 45 in greater detail, with reference to FIGS. 2 and 3 of the drawings, the assembly 45 includes a circular rigid member 86, which has a pair of depending triangular flanges 87 and 88, which are affixed to the respective upstanding legs 55 and 56 by any suitable technique, such as by welding. A ring 91 projects forwardly from the periphery of the circular member 86, for a hereinafter described purposes illustrated in FIG. 5.

As best seen in FIG. 2, a large rear external hub 93 is centrally disposed and projects rearwardly from the circular member 86, to define a central circular well 94. A small collar or hub 95 projects forwardly within the well 94, and has a central aperture 96 in a front annular face 97 of the collar or hub 95. A rear wall 101 of the rear external hub 93 includes a series of radially spacedapart apertures or holes 103 for receiving lugs or studs, such as the lug 32 of FIG. 1, of the strut assembly 20.

As best seen in FIG. 2, a well 105 defined by the rearward facing opening of the collar or hub 95 is adapted to receive an axle hub (not shown) of the strut assembly 20, whereby the central opening 96 in the annular front face 97 is aligned with a centering opening (not shown) in the end face of the axle hub so that a conventional centering pin (not shown) on the underside of the camber gauge mounting base 104 of the camber gauge 34 of FIG. 1. A plurality of permanent magnets 106 (FIG. 1) on the underside of the camber gauge base 104 are adapted to be attached magnetically to the annular front face 97 of the collar or hub 95 disposed within the well 94 to enable the gauge to be supported by the device 10.

The apertures or holes 103 are adapted to receive the studs, such as the stud 32. An annular rear face 120 of the hub 95 surrounds the well 105 and is adapted to be moved into engagement with a rotor (not shown) or the like of the strut assembly 20. The rear annular face or surface 120 is positioned in a parallel spaced-apart relationship relative to the annular front face 97. In this manner, when the gauge 34 is disposed with its mounting base 104 attached securely to the front face 97, the parallel faces 97 and 120, which are centrally disposed opposite to the central axis of the axle hub (not shown), the gauge 34 does not require zeroing. In this regard, since the gauge 34 is mounted centrally relative to the axle hub, and since the faces or surfaces 97 and 120 are parallel to one another, no gauge centering is required, even though the removed wheel rim (not shown) or the like is not entirely true.

Referring now to FIG. 4, there is shown a toe gauge 107, which is attached to the device 10. In this regard, a mounting base 108 having a plurality of permanent magnets 110 at its underside, is attached to the annular front face 97, in the same manner as the camber gauge 34 is attached thereto. Thus, the permanent magnets 110 of the mounting base 108 serve the same purpose as the permanent magnets 106 of the mounting base 104.

As shown in FIG. 5, another camber indicating device (not shown) may be attached to the wheel aligning device 10 by means of a gauge mounting assembly 113, which includes a set of three triangularly arranged locating pins 114, 115 and 116, which engage the ring 91 equidistantly. In this manner, a mounting plate 118 supports the other camber gauge (not shown), without the need for the hub 95.

While particular embodiments of the present invention have been disclosed, it is to be understood that various different modifications are possible and are contemplated within the true spirit and scope of the appended claims.

There is no intention, therefore, of limitations to the exact abstract or disclosure herein presented.

What is claimed is:

1. Wheel alignment device for attachment to a vehicle strut assembly having an axle hub, comprising:
    support means including a pair of rigid, spaced apart upright support members;
    rigid member means mounted on said support members and adapted to be mounted to the strut assembly;
    base means pivotally attached to said rigid member means at the bottom thereof to enable said rigid member means and said base means to pivot relative to one another during adjustment of said assembly, said base means being adjustable in its height dimension to accommodate different size vehicle wheels, said base means being an elongated block having a sufficient length to extend substantially the entire distance between said upright support members and having a plurality of elongated sides for engaging a supporting surface, said base means including pivot means disposed in an off-center position relative to a central axis of said base means to enable it to be rotated about said axis to enable a selected one of said sides to face downwardly;
    large hub means being connected to said rigid member means and projecting rearwardly therefrom defining a well, said hub means having an upright rear wall, said rear wall having a rear surface for engaging a portion of the vehicle strut assembly; and
    small hub means being connected to raid rear wall and projecting forwardly therefrom within said large hub well, said small hub means having a front upright wall positioned substantially parallel to said rear wall for receiving and supporting gauge means to facilitate wheel alignment and being opened at its rear to receive the vehicle axle hub.

2. Wheel alignment device according to claim 1, wherein said front wall is centrally apertured.

3. Wheel alignment device according to claim 2, wherein said rear wall includes a plurality of vehicle stud receiving apertures.

4. Wheel alignment device according to claim 2, wherein said base means includes a pair of spring means mounted at opposite ends of said block intermediate said block and the respective upright support members, for urging said block resiliently into a desired orientation relative to its axis.

5. Wheel alignment device according to claim 4, wherein said spring means include a pair of wave washers.

6. Wheel alignment device according to claim 2, wherein said base means includes a plurality of indicia on individual ones of the faces of said block to identify uniquely the height adjustment setting of the wheel aligning device.

7. Wheel alignment device according to claim 6, wherein said indicia includes a plurality of different colored surfaces of said block.

8. Wheel alignment device according to claim 7, wherein said base means includes a plurality of friction means on the faces of said block to enable it to grip frictionally a supporting surface.

9. Wheel alignment device according to claim 8, wherein said friction means includes a plurality of friction pads affixed to said block over the longitudinal corners thereof, said pads being longitudinally spaced apart to expose said indicia therebetween.

10. Wheel alignment device according to claim 5, wherein said base means includes a plurality of indicia on individual ones of the faces of said block to identify uniquely the height adjustment setting of the wheel aligning device.

11. Wheel alignment device according to claim 10, wherein said indicia includes a plurality of different colored surfaces of said block.

12. Wheel alignment device according to claim 11, wherein said base means includes a plurality of friction means on the faces of said block to enable it to grip frictionally a supporting surface.

13. Wheel alignment device according to claim 13, wherein said friction means includes a plurality of friction pads affixed to said block over the longitudinal corners thereof, said pads being longitudinally spaced apart to expose said indicia therebetween.

14. Wheel alignment device according to claim 13, wherein said rigid member means includes a forwardly projecting ring.

15. Wheel alignment device according to claim 14, wherein said rigid member means includes a generally circular member and a pair of depending triangular flanges.

* * * * *